US012616961B1

(12) United States Patent
Ibrahim et al.

(10) Patent No.: US 12,616,961 B1
(45) Date of Patent: May 5, 2026

(54) METHOD OF PRODUCING HYDROGEN GAS

(71) Applicant: IMAM MOHAMMAD IBN SAUD ISLAMIC UNIVERSITY, Riyadh (SA)

(72) Inventors: Mohamed Nady Abd El-Hameed Ibrahim, Riyadh (SA); Laila Saad Saied Alqarni, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/272,549

(22) Filed: Jul. 17, 2025

(51) Int. Cl.
| | |
|---|---|
| *B01J 23/72* | (2006.01) |
| *B01J 23/02* | (2006.01) |
| *B01J 23/34* | (2006.01) |
| *B01J 27/24* | (2006.01) |
| *B01J 37/04* | (2006.01) |
| *B01J 37/08* | (2006.01) |
| *B01J 37/34* | (2006.01) |
| *C01B 3/065* | (2026.01) |

(52) U.S. Cl.
CPC .............. *B01J 23/72* (2013.01); *B01J 23/02* (2013.01); *B01J 23/34* (2013.01); *B01J 27/24* (2013.01); *B01J 37/04* (2013.01); *B01J 37/08* (2013.01); *B01J 37/343* (2013.01); *C01B 3/065* (2013.01)

(58) Field of Classification Search
CPC ....................................................... B01J 23/02
See application file for complete search history.

(56) References Cited

U.S. PATENT DOCUMENTS

| | | | |
|---|---|---|---|
| 12,365,586 B1 * | 7/2025 | Abdulkhair | ............ B01J 35/633 |
| 2022/0243343 A1 | 8/2022 | Lee et al. | |

FOREIGN PATENT DOCUMENTS

| | | |
|---|---|---|
| CN | 116060137 B | 10/2023 |
| CN | 118807849 A | 10/2024 |
| JP | 2009-247961 A | 10/2009 |

OTHER PUBLICATIONS

Khursheed Ahmad, et al., "Fabrication of MnO2/g-C3N4 hetero-junction for hydrogen production and rhodamine B/methylene blue dye degradation", Optical Materials, vol. 140, May 2, 2023, 113857, Excerpts only, 8 pages.
Hani Nasser Abdelhamid, "An introductory review on advanced multifunctional materials", Heliyon, vol. 9, e18060, Jul. 8, 2023, 30 pages.

* cited by examiner

*Primary Examiner* — Paul A Wartalowicz
(74) *Attorney, Agent, or Firm* — Oblon, McClelland, Maier & Neustadt, L.L.P.

(57) ABSTRACT

A method of producing hydrogen gas that includes contacting a catalytic $MnO_2/MgO/CuO/g\text{-}C_3N_4$ nanocomposite with a solution including water and a borohydride source. The catalytic $MnO_2/MgO/CuO/g\text{-}C_3N_4$ nanocomposite includes 5 to 15 wt. % MgO nanoparticles, 5 to 15 wt. % $MnO_2$ nanoparticles, 15 to 25 wt. % CuO nanoparticles, and 55 to 65 wt. % $g\text{-}C_3N_4$ nanosheets. The MgO nanoparticles, $MnO_2$ nanoparticles, and CuO nanoparticles are disposed on the $g\text{-}C_3N_4$ nanosheets.

16 Claims, 4 Drawing Sheets

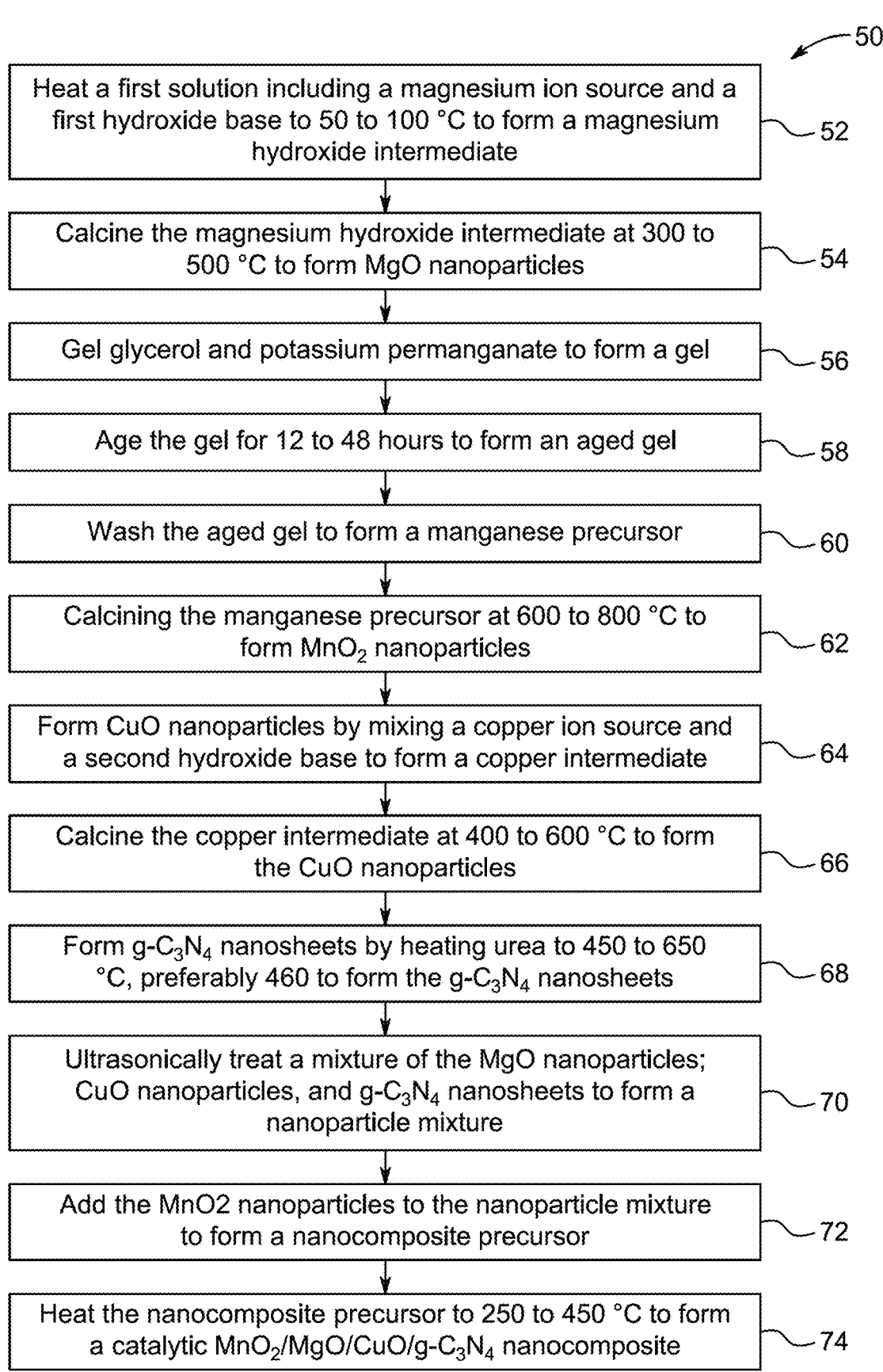

50

Heat a first solution including a magnesium ion source and a first hydroxide base to 50 to 100 °C to form a magnesium hydroxide intermediate — 52

Calcine the magnesium hydroxide intermediate at 300 to 500 °C to form MgO nanoparticles — 54

Gel glycerol and potassium permanganate to form a gel — 56

Age the gel for 12 to 48 hours to form an aged gel — 58

Wash the aged gel to form a manganese precursor — 60

Calcining the manganese precursor at 600 to 800 °C to form $MnO_2$ nanoparticles — 62

Form CuO nanoparticles by mixing a copper ion source and a second hydroxide base to form a copper intermediate — 64

Calcine the copper intermediate at 400 to 600 °C to form the CuO nanoparticles — 66

Form $g$-$C_3N_4$ nanosheets by heating urea to 450 to 650 °C, preferably 460 to form the $g$-$C_3N_4$ nanosheets — 68

Ultrasonically treat a mixture of the MgO nanoparticles; CuO nanoparticles, and $g$-$C_3N_4$ nanosheets to form a nanoparticle mixture — 70

Add the MnO2 nanoparticles to the nanoparticle mixture to form a nanocomposite precursor — 72

Heat the nanocomposite precursor to 250 to 450 °C to form a catalytic $MnO_2$/MgO/CuO/$g$-$C_3N_4$ nanocomposite — 74

FIG. 1

METHOD OF PRODUCING HYDROGEN GAS

BACKGROUND

Technical Field

The present disclosure is directed towards a method of producing hydrogen gas using a particulate crystalline nanocomposite catalyst.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The increasing global industrialization and population growth have resulted in a heightened demand for sustainable and reliable energy sources capable of addressing the growing need for electricity. The depletion of non-renewable energy resources and escalating environmental concerns have prompted the urgent need for a transition to alternative, renewable energy solutions. While solar energy offers an abundant and cost-effective option, challenges remain in energy storage due to reliance on expensive and disposable batteries, which require frequent replacement. Additionally, the combustion of fossil fuels continues to release harmful emissions, including carbon dioxide, nitrogen oxides, sulfur oxides, and particulate matter, contributing to various environmental pollution problems.

In response to these challenges, there exists a growing need for clean, renewable energy sources and storage forms. Hydrogen ($H_2$) has emerged as a promising energy carrier due to its high energy density, non-toxicity, and environmental benefits. Specifically, hydrogen's energy density is significantly higher than that of liquid hydrocarbons, positioning it as an attractive solution for energy storage and production. However, challenges related to hydrogen production, storage, and transportation persist, including high costs associated with compression, liquefaction, and the potential for gas leakage under high pressure.

Metal hydrides have been proposed as a means of storing hydrogen, but their practical application is limited by the need for elevated temperatures and sensitivity to air, which restrict their widespread use. Borohydrides, particularly sodium borohydride ($NaBH_4$), have been identified as a superior alternative for hydrogen storage due to their high hydrogen storage capacity, thermal and chemical stability, and environmentally friendly byproducts. Sodium borohydride is a stable, lightweight material capable of efficiently releasing hydrogen, making it a viable candidate for on-demand hydrogen production.

While metal borohydrides have excellent properties for storging hydrogen, they suffer from disadvantages is retrieving the stored hydrogen in usable form. Typically, the rates of hydrogen production from metal borohydrides are sluggish or inefficient. To improve production rates, methods primarily rely on costly and rare noble metal catalysts, which hinder the scalability and practicality of such processes due to their high cost, low abundance, and possible incompatibility with other processes or subsequent use. As such, there is a growing interest in developing catalysts based on more abundant and cost-effective transition metals.

Accordingly, one objective of the present disclosure is to provide methods and compositions that enhance the performance, reduce costs, and offer greater flexibility in producing hydrogen, thereby overcoming the aforementioned drawbacks and limitations associated with known materials and methods for hydrogen production from borohydrides.

SUMMARY

According to a first aspect, the present disclosure relates to a method of producing hydrogen gas. In some embodiments, the method includes contacting a catalytic $MnO_2/MgO/CuO/g\text{-}C_3N_4$ nanocomposite with a solution including water and a borohydride source. In some embodiments, the catalytic $MnO_2/MgO/CuO/g\text{-}C_3N_4$ nanocomposite includes 5 to 15 wt. % MgO nanoparticles, 5 to 15 wt. % $MnO_2$ nanoparticles, 15 to 25 wt. % CuO nanoparticles, and 55 to 65 wt. % $g\text{-}C_3N_4$ nanosheets. In some embodiments, the MgO nanoparticles, $MnO_2$ nanoparticles, and CuO nanoparticles are disposed on the $g\text{-}C_3N_4$ nanosheets.

In some embodiments, the MgO nanoparticles have a mean particle size of 10 to 1000 nanometers (nm). The $MnO_2$ nanoparticles have a mean particle size of 10 to 1000 nm. The CuO nanoparticles have a mean particle size of 10 to 1000 nm.

In some embodiments, the $g\text{-}C_3N_4$ nanosheets have a mean nanosheet size of 50 to 5000 nm and a mean nanosheet thickness of 0.5 to 50 nm.

In some embodiments, the method includes forming the catalytic $MnO_2/MgO/CuO/g\text{-}C_3N_4$ nanocomposite. In some embodiments, the method includes ultrasonically treating a mixture of the MgO nanoparticles, CuO nanoparticles, and $g\text{-}C_3N_4$ nanosheets to form a nanoparticle mixture. In some embodiments, the method includes adding the $MnO_2$ nanoparticles to the nanoparticle mixture to form a nanocomposite precursor. In some embodiments, the method includes heating the nanocomposite precursor to 250 to 450° C. to form the catalytic $MnO_2/MgO/CuO/g\text{-}C_3N_4$ nanocomposite.

In some embodiments, the method further includes heating a first solution including a magnesium ion source and a first hydroxide base to 50 to 100° C. to form a magnesium hydroxide intermediate. In some embodiments, the method further includes calcining the magnesium hydroxide intermediate at 300 to 500° C. to form the MgO nanoparticles.

In some embodiments, the first hydroxide base is NaOH.

In some embodiments, the magnesium ion source is magnesium nitrate.

In some embodiments, the first solution has a molar ratio of magnesium ion source to first hydroxide base of 1:8 to 1:1.

In some embodiments, the method further includes gelling glycerol and potassium permanganate to form a gel. In some embodiments, the method further includes aging the gel for 12 to 48 hours to form an aged gel. In some embodiments, the method further includes washing the aged gel to form a manganese precursor. In some embodiments, the method further includes calcining the manganese precursor at 600 to 800° C. to form the $MnO_2$ nanoparticles.

In some embodiments, the gel has a molar ratio of potassium permanganate to glycerol of 1:10 to 1:2.

In some embodiments, the method further includes forming the CuO nanoparticles by mixing a copper ion source and a second hydroxide base to form a copper intermediate. In some embodiments, the method includes calcining the copper intermediate at 400 to 600° C. to form the CuO nanoparticles.

In some embodiments, the second hydroxide base is NaOH.

In some embodiments, the copper ion source is copper chloride.

In some embodiments, the method further includes forming the g-$C_3N_4$ nanosheets by heating urea to 450 to 650° C. to form the g-$C_3N_4$ nanosheets.

In some embodiments, the borohydride source is sodium borohydride.

In some embodiments, the method has a hydrogen generation rate of 850 to 1150 milliliters per minute per gram (mL min$^{-1}$ g$^{-1}$) of sodium borohydride at 40° C.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1 is a schematic flow chart of a method of preparing a catalytic $MnO_2/MgO/CuO/g$-$C_3N_4$ nanocomposite, according to certain embodiments.

DETAILED DESCRIPTION

Figure 2A:
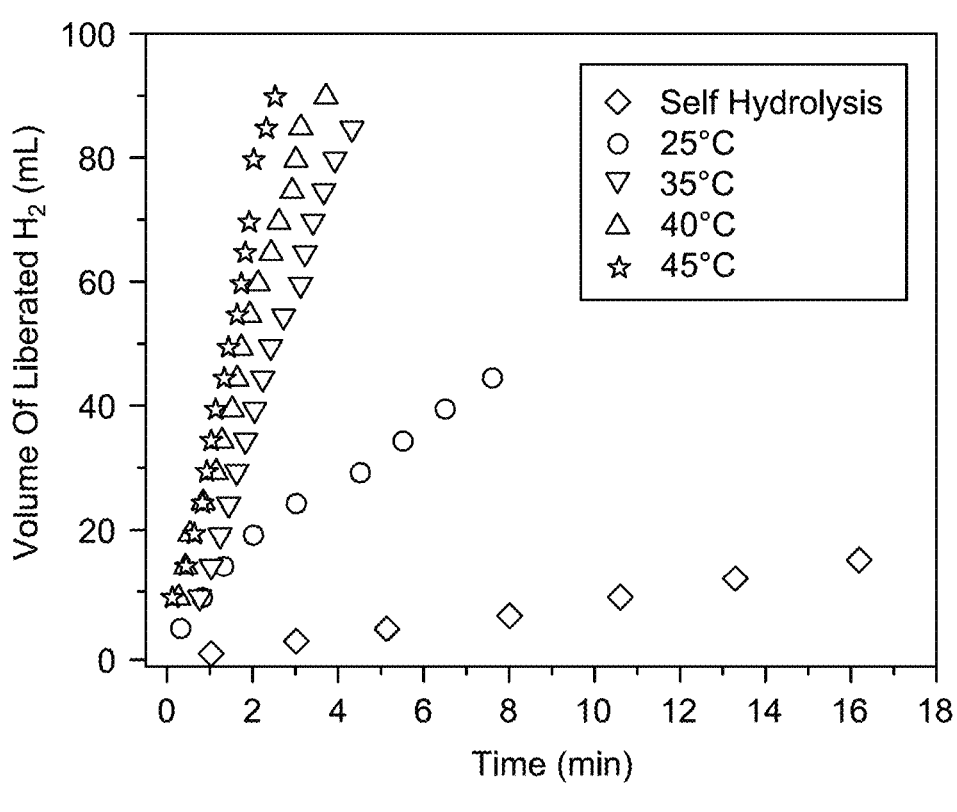
FIG. 2A shows variation of volume of liberated $H_2$ with reaction time with the $MnO_2@MgO\cdot CuO@g$-$C_3N_4$ composite, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

As used herein, the words "about," "approximately," or "substantially similar" may be used when describing magnitude and or position to indicate that the value and/or position described is within a reasonable expected range of values and/or positions. For example, a numeric value may have a value that is +/−0.1% of the stated value (or range of values), +/−1% of the slated value (or range of values), +/−2% of the stated value (or range of values), +/−5% of the slated value (or range of values), +/−10% of the staled value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

A weight percent of a component, unless specifically stated to the contrary, is based on the total weight of the formulation or composition in which the component is included. For example, if a particular element or component in a composition or article is said to have 5 weight percent (wt. %), it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopically-labelled compounds of the disclosure may generally be prepared by conventional techniques known to those skilled in the art or by processes analogous to those described herein, using an appropriate isotopically-labelled reagent in place of the non-labelled reagent otherwise employed.

As used herein, the term 'amount' refers to the proportion or presence of a particular substance, component, or element within a larger system. It can be quantified in various ways, such as percentage, concentration, or mass. The content of an element refers to its proportion or concentration within a given material, mixture, or compound. It can be expressed in various units such as atomic percent (at. %), weight percent (wt. %), or mole fraction.

As used herein, the term 'nanocomposite' refers to a composite material that has at least one component with a grain size measured in nanometers (nm).

As used herein, the term 'gel' is a soft, typically translucent, solid material that has a three-dimensional network structure, where a liquid phase is trapped within the network of solid components. Gels exhibit both solid-like and liquid-like properties, depending on the external conditions, but they retain their shape and have a gel-like consistency.

As used herein, the term 'hydrogen generation rate (HGR)' refers to the amount of hydrogen gas produced per unit of time and mass of a catalyst or material involved in the reaction. It is typically expressed in units such as millilitres of hydrogen per minute per gram (mL min$^{-1}$·g$^{-1}$). HGR is an important parameter in evaluating the efficiency and performance of materials used in hydrogen production processes, such as those involving the hydrolysis of chemical hydrides or electrolysis.

According to a first aspect, the present disclosure relates to a method of forming hydrogen gas. In some embodiments, the method includes contacting a catalytic $MnO_2/MgO/CuO/g$-$C_3N_4$ nanocomposite with a solution including water and a borohydride source.

In general, the water may be any suitable water. Examples of suitable water include, but are not limited to tap water, distilled water, bi-distilled water, deionized water, deionized distilled water, reverse osmosis water, hard water, fresh water, brine/salt water, or the hard water. In some embodiments, the water is distilled water.

In general, the borohydride source can be any suitable borohydride source. Examples of suitable sources of borohydride include, but are not limited to, lithium borohydride, potassium borohydride, calcium borohydride, magnesium borohydride, aluminum borohydride, zinc borohydride, barium borohydride, cesium borohydride, rubidium borohydride, strontium borohydride, tetrabutylammonium borohydride, ammonium borohydride, trimethylammonium borohydride, benzyltrimethylammonium borohydride, potassium tetraphenylborate, lithium tetrafluoroborate, potassium tetrafluoroborate, sodium tetrafluoroborate, copper borohydride, nickel borohydride, iron borohydride, lead borohydride, copper(II) borohydride, thallium borohydride, gold borohydride, silver borohydride, rhodium borohydride, palladium borohydride, antimony borohydride, and combinations thereof. In some embodiments, the borohydride source is an alkali metal borohydride. In some embodiments, the borohydride source is sodium borohydride.

In some embodiments, the catalytic $MnO_2/MgO/CuO/g$-$C_3N_4$ nanocomposite includes 5 to 15 wt. % MgO nanoparticles, based on a total weight of the catalytic $MnO_2/MgO/CuO/g$-$C_3N_4$ nanocomposite. For example, the nanocomposite can include 5.0 wt. %, 5.25 wt. %, 5.5 wt. % 5.75 wt. %, 6.0 wt. %, 6.25 wt. %, 6.5 wt. % 6.75 wt. %, 7.0 wt. %, 7.25 wt. %, 7.5 wt. % 7.75 wt. %, 8.0 wt. %, 8.25 wt. %, 8.5 wt. % 8.75 wt. %, 9.0 wt. %, 9.25 wt. %, 9.5 wt. % 9.75 wt. %, 10.0 wt. %, 10.25 wt. %, 10.5 wt. %, 10.75 wt. %, 11.0 wt. %, 11.25 wt. %, 11.5 wt. %, 11.75 wt. %, 12.0 wt. %, 12.25 wt. %, 12.5 wt. %, 12.75 wt. %, 13.0 wt. %, 13.25 wt. %, 13.5 wt. %, 13.75 wt. %, 14.0 wt. %, 14.25 wt. %, 14.5 wt. %, 14.75 wt. %, or 15.0 wt. % MgO nanoparticles.

In some embodiments, the catalytic $MnO_2/MgO/CuO/g$-$C_3N_4$ nanocomposite includes 5 to 15 wt. % $MnO_2$ nanoparticles, based on a total weight of the catalytic $MnO_2/MgO/CuO/g$-$C_3N_4$ nanocomposite. For example, the nanocomposite can include 5.0 wt. %, 5.25 wt. %, 5.5 wt. % 5.75 wt. %, 6.0 wt. %, 6.25 wt. %, 6.5 wt. % 6.75 wt. %, 7.0 wt. %, 7.25 wt. %, 7.5 wt. % 7.75 wt. %, 8.0 wt. %, 8.25 wt. %, 8.5 wt. % 8.75 wt. %, 9.0 wt. %, 9.25 wt. %, 9.5 wt. % 9.75 wt. %, or 10.0 wt. % $MnO_2$ nanoparticles.

In some embodiments, the catalytic $MnO_2/MgO/CuO/g$-$C_3N_4$ nanocomposite includes 15 to 25 wt. % CuO nanoparticles, based on a total weight of the catalytic $MnO_2/MgO/CuO/g$-$C_3N_4$ nanocomposite. For example, the nanocomposite can include 15.0 wt. %, 15.5 wt. %, 16.0 wt. %, 16.5 wt. %, 17.0 wt. %, 17.5 wt. %, 18.0 wt. %, 18.5 wt. %, 19.0 wt. %, 19.5 wt. %, 20.0 wt. %, 20.5 wt. %, 21.0 wt. %, 21.5 wt. %, 22.0 wt. %, 22.5 wt. %, 23.0 wt. %, 23.5 wt. %, 24.0 wt. %, 24.5 wt. %, or 25.0 wt. % CuO nanoparticles.

In some embodiments, the catalytic $MnO_2/MgO/CuO/g$-$C_3N_4$ nanocomposite includes 55 to 65 wt. % g-$C_3N_4$ nanosheets, based on a total weight of the catalytic $MnO_2/MgO/CuO/g$-$C_3N_4$ nanocomposite. For example, the nanocomposite can include 55.0 wt. %, 55.5 wt. %, 56.0 wt. %, 56.5 wt. %, 57.0 wt. %, 57.5 wt. %, 58.0 wt. %, 58.5 wt. %, 59.0 wt. %, 59.5 wt. %, 60.0 wt. %, 60.5 wt. %, 61.0 wt. %, 61.5 wt. %, 62.0 wt. %, 62.5 wt. %, 63.0 wt. %, 63.5 wt. %, 64.0 wt. %, 64.5 wt. %, or 65.0 wt. % g-$C_3N_4$ nanosheets.

In some embodiments, the MgO nanoparticles, $MnO_2$ nanoparticles, and CuO nanoparticles are disposed on the g-$C_3N_4$ nanosheets. In some embodiments, the MgO nanoparticles, $MnO_2$ nanoparticles, and CuO nanoparticles are deposited on the g-$C_3N_4$ nanosheets partially or wholly in a uniform and continuous manner.

In some embodiments, the nanocomposite comprises $C_3N_4$ nanosheets. In some embodiments, the $C_3N_4$ nanosheets may consist of stacks of $C_3N_4$ sheets, the stacks having an average thickness and a diameter. In some embodiments, the stacks comprise 1 to 60 sheets of $C_3N_4$, preferably 2 to 55 sheets of $C_3N_4$, preferably 3 to 50 sheets of $C_3N_4$.

In some embodiments, the $C_3N_4$ is in the form of $C_3N_4$ nanosheets. The $C_3N_4$ nanosheets may be shaped like blocks, flakes, ribbons, discs, granules, platelets, angular chunks, rectangular prisms, or some other shape. For the $C_3N_4$ nanosheets, a particle size may refer to a length of the nanosheet, a width of the nanosheet, an average of the length and width of the nanosheet, a thickness of the nanosheet, or an average of the length, width, and thickness of the nanosheet.

In some embodiments, the g-$C_3N_4$ nanosheets have a mean nanosheet size of 50 to 5000 nm, preferably 100 to 4900 nm, preferably 200 to 4800 nm, preferably 300 to 4700 nm, preferably 400 to 4600 nm, preferably 500 to 4500 nm, preferably 600 to 4400 nm, preferably 700 to 4300 nm, preferably 800 to 4200 nm, preferably 900 to 4100 nm, preferably 1000 to 4000 nm. In some embodiments, the g-$C_3N_4$ nanosheets have a mean nanosheet thickness of 0.5 to 50 nm, preferably 1 to 49 nm, preferably 2 to 48 nm, preferably 3 to 47 nm, preferably 4 to 46 nm, preferably 5 to 45 nm, preferably 6 to 44 nm, preferably 7 to 43 nm, preferably 8 to 42 nm, preferably 9 to 41 nm, preferably 10 to 40 nm.

In some embodiments, the sheets (nanosheets) have a monodisperse thickness, having a coefficient of variation or relative standard deviation, expressed as a percentage and defined as the ratio of the sheet thickness standard deviation ($\sigma$) to the sheet thickness mean ($\mu$), multiplied by 100%, of less than 25%, preferably less than 10%, preferably less than 8%, preferably less than 6%, preferably less than 5%. In a preferred embodiment, the sheets have a monodisperse thickness, having a size distribution ranging from 80% of the average thickness to 120% of the average thickness, preferably 85 to 115%, preferably 90 to 110% of the average thickness. In another embodiment, the sheets do not have a monodisperse thickness. In some embodiments, the sheets have a monodisperse diameter, having a coefficient of variation or relative standard deviation, expressed as a percentage and defined as the ratio of the sheet diameter standard deviation ($\sigma$) to the sheet diameter mean ($\mu$), multiplied by 100%, of less than 25%, preferably less than 10%, preferably less than 8%, preferably less than 6%, preferably less than 5%. In a preferred embodiment, the sheets have a monodisperse diameter, having a size distribution ranging from 80% of the average diameter to 120% of the average diameter, preferably 85 to 115%, preferably 90 to 110% of the average diameter. In another embodiment, the sheets do not have a monodisperse diameter.

In some embodiments, the nanocomposite comprises nanoparticles. In some embodiments, the nanocomposite comprises separate $MnO_2$ nanoparticles, MgO nanoparticles, and CuO nanoparticles. In some embodiments, the nanoparticles can include two or more of the $MnO_2$, the MgO, and the CuO. For example, the nanoparticles can include MgO and CuO, $MnO_2$ and MgO, $MnO_2$ and CuO or other combinations. In some embodiments, the nanoparticles include all of the $MnO_2$, MgO, and CuO. In some embodiments, the nanoparticles include multiple types of nanoparticles. Such types of nanoparticles can be distinguished by the composition (e.g., which phase(s) are present in the nanoparticles), by size, by shape, by porosity, or some combination of these. For example, the nanoparticles can include separate magnesium iron aluminum oxide nanoparticles, magnesium oxide nanoparticles, and carbon nanoparticles. In some embodiments, the nanocomposite further comprises microparticles.

In general, the particles (e.g., the nanoparticles) can be any shape known to one of ordinary skill in the art. Examples of suitable shapes the particles may take include spheres, spheroids, lentoids, ovoids, solid polyhedra such as tetrahedra, cubes, octahedra, icosahedra, dodecahedra, hollow polyhedra (also known as nanocages), stellated polyhedra (both regular and irregular, also known as nanostars), triangular prisms (also known as nanotriangles), hollow spherical shells (also known as nanoshells), tubes (also known as nanotubes), sheets, platelets, disks, rods (also known as nanorods), belts (also known as nanobelts), ribbons (also known as nanoribbons), and mixtures thereof. In the case of rods, the rod shape may be defined by a ratio of a rod length to a rod width, the ratio being known as the aspect ratio. For particles of the current invention, rods should have an aspect ratio less than 1000, preferably less than 750, preferably less than 500, preferably less than 250, preferably less than 100, preferably less than 75, preferably less than 50, preferably less than 25.

In some embodiments, the particles (or type of particles) have a uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of particles (or type of particles) having a different shape. As used herein, the term "non-uniform shape" refers to an average consistent shape that differs by more than 10% of the distribution of particles having a different shape. In one embodiment, the shape is uniform and at least 90% of the particles (or type of particles) are spherical or substantially circular, and less than 10% are polygonal. In another embodiment, the shape is non-uniform and less than 90% of the particles are spherical or substantially circular, and greater than 10% are polygonal.

In some embodiments, the particles have a mean particle size of 10 nm to 1000 nm. For example, the nanoparticles may have a mean size of 10 nm, 12.5 nm, 15 nm, 17.5 nm, 20 nm, 22.5 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, 125 nm, 150 nm, 175 nm, 200 nm, 225 nm, 250 nm, 275 nm, 300 nm, 325 nm, 350 nm, 375 nm, 400 nm, 425 nm, 450 nm, 475 nm, 500 nm, 525 nm, 550 nm, 575 nm, 600 nm, 625 nm, 650 nm, 675 nm, 700 nm, 725 nm, 750 nm, 775 nm, 800 nm, 825 nm, 850 nm, 875 nm, 900 nm, 925 nm, 950 nm, 975 nm, or 1000 nm.

In some embodiments, the MgO nanoparticles have a mean particle size of 10 to 1000 nanometers (nm). For example, the MgO nanoparticles may have a mean size of 10 nm, 12.5 nm, 15 nm, 17.5 nm, 20 nm, 22.5 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, 125 nm, 150 nm, 175 nm, 200 nm, 225 nm, 250 nm, 275 nm, 300 nm, 325 nm, 350 nm, 375 nm, 400 nm, 425 nm, 450 nm, 475 nm, 500 nm, 525 nm, 550 nm, 575 nm, 600 nm, 625 nm, 650 nm, 675 nm, 700 nm, 725 nm, 750 nm, 775 nm, 800 nm, 825 nm, 850 nm, 875 nm, 900 nm, 925 nm, 950 nm, 975 nm, or 1000 nm.

In some embodiments, the $MnO_2$ nanoparticles have a mean particle size of 10 to 1000 nm. For example, the $MnO_2$ nanoparticles may have a mean size of 10 nm, 12.5 nm, 15 nm, 17.5 nm, 20 nm, 22.5 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, 125 nm, 150 nm, 175 nm, 200 nm, 225 nm, 250 nm, 275 nm, 300 nm, 325 nm, 350 nm, 375 nm, 400 nm, 425 nm, 450 nm, 475 nm, 500 nm, 525 nm, 550 nm, 575 nm, 600 nm, 625 nm, 650 nm, 675 nm, 700 nm, 725 nm, 750 nm, 775 nm, 800 nm, 825 nm, 850 nm, 875 nm, 900 nm, 925 nm, 950 nm, 975 nm, or 1000 nm.

In some embodiments, the CuO nanoparticles have a mean particle size of 10 to 1000 nm. For example, the CuO nanoparticles may have a mean size of 10 nm, 12.5 nm, 15 nm, 17.5 nm, 20 nm, 22.5 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, 125 nm, 150 nm, 175 nm, 200 nm, 225 nm, 250 nm, 275 nm, 300 nm, 325 nm, 350 nm, 375 nm, 400 nm, 425 nm, 450 nm, 475 nm, 500 nm, 525 nm, 550 nm, 575 nm, 600 nm, 625 nm, 650 nm, 675 nm, 700 nm, 725 nm, 750 nm, 775 nm, 800 nm, 825 nm, 850 nm, 875 nm, 900 nm, 925 nm, 950 nm, 975 nm, or 1000 nm.

In embodiments where the particles are spherical, the particle size may refer to a particle diameter. In embodiments where the particles are polyhedral or some other non-spherical shape, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the particles have an anisotropic shape such as rods, the particle size may refer to a length of the rod, a width of the rod, or an average of the length and width of the rod. In some embodiments in which the particles have non-spherical shapes, the particle size refers to the diameter of a sphere having an equivalent volume as the particle. In some embodiments in which the nanoparticles have non-spherical shapes, the particle size refers to the diameter of a sphere having an equivalent diffusion coefficient as the particle.

In some embodiments, the nanocomposite is in the form of aggregates. The aggregates can include any suitable combination of types of nanoparticles. For example, the aggregates can include the $MnO_2$ nanoparticles, MgO nanoparticles, and CuO nanoparticles.

In some embodiments, the particles of the present disclosure are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the particles of the present disclosure are monodisperse having a particle size distribution ranging from 80% of the average particle size to 120% of the average particle size, preferably 90-110%, preferably 95-105% of the average particle size. In some embodiments, the particles are not monodisperse.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

In an embodiment, the catalytic $MnO_2/MgO/CuO/g\text{-}C_3N_4$ nanocomposite may be porous. A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm. The term 'mesoporous' means the pores of the nanocomposite have an average pore width of 2-50 nm. The term 'macroporous' means the pores of nanocomposite have an average pore width larger than 50 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT). In general, the catalytic $MnO_2/MgO/CuO/g\text{-}C_3N_4$ nanocomposite may be microporous, meosoporous, or both. In some embodiments, the catalytic $MnO_2/MgO/CuO/g\text{-}C_3N_4$ nanocomposite may be porous, and the pores may be in the form of slits.

FIG. 1 illustrates a flow chart of a method 50 of forming a catalytic $MnO_2/MgO/CuO/g\text{-}C_3N_4$ nanocomposite. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes heating a first solution including a magnesium ion source and a first hydroxide base to 50 to 100° C. to form a magnesium hydroxide intermediate. Suitable examples of the first hydroxide base include sodium hydroxide, potassium hydroxide, calcium hydroxide, magnesium hydroxide, lithium hydroxide, barium hydroxide, aluminum hydroxide. In some embodiments, the first hydroxide base is NaOH. The first solution may be heated to a temperature of, for example, 50° C., 55° C., 60°

C., 65° C., 70° C., 75° C., 80° C., 85° C., or 90° C. In some embodiments, the first solution is heated to a temperature of 80° C.

In general, the magnesium ion source can be any suitable source of magnesium ions known to one of ordinary skill in the art. Examples of suitable magnesium ion sources include, but are not limited to, magnesium sulfate, magnesium chloride, magnesium nitrate, magnesium acetate, magnesium carbonate, magnesium hydroxide, magnesium oxide, magnesium phosphate, magnesium citrate, magnesium lactate, magnesium malate, magnesium aspartate, magnesium gluconate, magnesium stearate, magnesium bromide, magnesium fluoride, magnesium formate, magnesium pyrophosphate. In some embodiments, the magnesium ion source is magnesium nitrate.

In some embodiments, the first solution has a molar ratio of magnesium ion source to first hydroxide base of 1:8 to 1:1. For example, the molar ratio of magnesium ion source to first hydroxide base may be 1:8, 1:7.75, 1:7.5, 1:7.25, 1:7.0, 1:6.75, 1:6.5, 1:6.25, 1:6.0, 1:5.75, 1:5.5, 1:5.25, 1:5.0, 1:4.75, 1:4.5, 1:4.25, 1:4.0, 1:3.75, 1:3.5, 1:3.25, 1:3.0, 1:2.75, 1:2.5, 1:2.25, 1:2.0, 1:1.75, 1:1.5, 1:1.25, or 1:1.0.

At step 54, the method 50 includes calcining the magnesium hydroxide intermediate at 300 to 500° C. to form the MgO nanoparticles. For example, the calcination can be performed at 300° C., 310° C., 320° C., 330° C., 340° C., 350° C., 360° C., 370° C., 380° C., 390° C., 400° C., 410° C., 420° C., 430° C., 440° C., 450° C., 460° C., 470° C., 480° C., 490° C., or 500° C. In some embodiments, the calcining is performed at 400° C. The calcination is carried out by heating it to a high temperature under a restricted supply of ambient oxygen. This is performed to remove impurities or volatile substances and to incur thermal decomposition. Typically, the calcination is carried out in a furnace, preferably equipped with a temperature control system, which may provide a heating rate of up to 50° C./min, preferably up to 40° C./min, preferably up to 30° C./min, preferably up to 20° C./min, preferably up to 10° C./min, preferably up to 5° C./min.

At step 56, the method 50 includes gelling a polyol and potassium permanganate to form a gel. In some embodiments, the gel has a molar ratio of potassium permanganate to the polyol of 1:10 to 1:2. For example, the gel may have a molar ratio of 1:10.0, 1:9.75, 1:9.5, 1:9.25, 1:8.75, 1:8.5, 1:8.25, 1:8.0, 1:7.75, 1:7.5, 1:7.25, 1:7.0, 1:6.75, 1:6.5, 1:6.25, 1:6.0, 1:5.75, 1:5.5, 1:5.25, 1:5.0, 1:4.75, 1:4.5, 1:4.25, 1:4.0, 1:3.75, 1:3.5, 1:3.25, 1:3.0, 1:2.75, 1:2.5, 1:2.25, or 1:2.0. In some embodiments, the gel has a molar ratio of potassium permanganate to the polyol of 4:3.

In certain embodiments, the polyol comprises or consists of at least one selected from a diol, a triol, and a polyol having 4 to 6 hydroxyl groups. Exemplary diols may be saturated or unsaturated and may be aliphatic, cycloaliphatic or aromatic dihydroxy compounds. The diols may typically have a molecular weight of 250 g/mol. or less. When used herein, the term "diol" can include equivalent ester forming derivatives thereof, provided, however, that the molecular weight requirement pertains to the diol only and not to its derivative. Exemplary ester forming derivatives include the acetates of the diols as well as, for example, ethylene oxide or ethylene carbonate for ethylene glycol.

Typical diols having utility herein are those having from 2 to 20 carbon atoms. Examples of these diols include: ethane-1,2-diol (ethylene glycol); propane-1,2-diol (propylene glycol); 1,3-propane diol; 1,2-butane diol; 2-methyl propanediol; 1,3-butane diol; 1,4-butane diol; 2,3-butanediol; neopentyl glycol; hexanediol; decanediol; hexamethylene glycol; cyclohexane dimethanol; polyoxalkylene glycols, such as diethylene glycol, dipropylene glycol, triethylene glycol, tetraethylene glycol, tripropylene glycol and tetrapropylene glycol; and, aromatic diols, such as bisphenol A, bisphenol F, hydrogenated bisphenol A and hydrogenated bisphenol F. Mixtures of such diols may be employed.

In some embodiments, the polyol comprises or consists of a triol. Suitable triols may be saturated or unsaturated and may be aliphatic, cycloaliphatic or aromatic compounds: the compounds can typically have a molecular weight of 400 g/mol. or less. Non-limiting examples of aliphatic triols include: 1,2,3-propanetriol (glycerol); 1,2,4-butanetriol; 2-ethyl-2-hydroxymethyl-1,3-propanediol (trimethylolpropane); 3-methyl-1,3,5-pentanetriol; 1,2,3-hexanetriol; 1,2,6-hexanetriol; 2,5-dimethyl-1,2,6-hexanetriol; 1,2,3-heptanetriol; 1,2,3-octanetriol; and, 2-hydroxymethyl-1,3-propanediol.

In some embodiments, the polyol comprises or consists of a polyol having from 4 to 6 hydroxyl groups. Suitable polyols having from 4 to 6 hydroxyl groups may be saturated or unsaturated and may be aliphatic, cycloaliphatic or aromatic compounds: the compounds can typically have a molecular weight of 400 g/mol. or less. Non-limiting examples of aliphatic tetrols and aliphatic pentols include: 2,2-bis(hydroxymethyl)propane-1,3-diol (pentaerythritol); pentose; pentopyranose; 6-deoxyhexopyranose; 2,5-anhydrohexitol; 1,5-anhydrohexitol; 6-deoxyhexose; 1-deoxyhexitol; and pentitol. An exemplary polyol having six hydroxyl groups is D-glucitol (sorbitol). In embodiments, 2-ethyl-2-hydroxymethyl-1,3-propanediol (trimethylolpropane), 2,2-bis(hydroxymethyl)propane-1,3-diol (pentaerythritol) or mixtures thereof may be used.

In some embodiments, the gel may include other reducing agents (e.g., glucose, sucrose, ethylene glycol), oxidizing agents (e.g., sodium permanganate, potassium dichromate), surfactants or polymers (e.g., polyvinyl alcohol (PVA), polyvinyl alcohol (PEG)), non-aqueous solvents (e.g., ethanol, methanol, acetone), or combinations of these.

At step 58, the method 50 includes aging the gel for 12 to 48 hours, preferably 14 hours, preferably 16 hours, preferably 18 hours, preferably 20 hours, preferably 22 hours, preferably 24 hours to form an aged gel. The aging may be advantageous allow the gel to stabilize and ensure complete reaction between the glycerol and the potassium permanganate. The aging process may improve the uniformity, structural integrity, or both. In some embodiments, the aging may be performed by leaving the gel undisturbed for a specified period, at ambient or elevated temperatures. In some embodiments, the aging may be done in a humidified environment, with intermittent stirring or shaking for uniformity, or under a vacuum or inert gas atmosphere to prevent oxidation.

At step 60, the method 50 includes washing the aged gel to form a manganese precursor. In some embodiments, the aged gel is washed with distilled water. In some embodiments, the aged gel may be washed with a mixture of water and ethanol, or with a buffered solution to maintain pH. In some embodiments, the gel may be rinsed using a solvent such as methanol, acetone, or isopropanol.

At step 62, the method 50 includes calcining the manganese precursor at 600 to 800° C. to form the $MnO_2$ nanoparticles. For example, the calcining can be performed at 600° C., 610° C., 620° C., 630° C., 640° C., 650° C., 660°

C., 670° C., 680° C., 690° C., 700° C., 710° C., 720° C., 730° C., 740° C., 750° C., 760° C., 770° C., 780° C., 790° C., or 800° C.

At step 64, the method 50 includes forming the CuO nanoparticles by mixing a copper ion source and a second hydroxide base to form a copper intermediate. Suitable examples of the second hydroxide base include sodium hydroxide, potassium hydroxide, calcium hydroxide, magnesium hydroxide, lithium hydroxide, barium hydroxide, aluminum hydroxide. In some embodiments, the second hydroxide base is NaOH.

In general, the copper ion source can be any suitable source of copper ions known to one of ordinary skill in the art. Examples of suitable copper ion sources include, but are not limited to, copper sulfate, copper chloride, copper nitrate, copper acetate, copper carbonate, copper hydroxide, copper oxide, copper bromide, copper phosphate, copper citrate, copper gluconate, copper sulfate pentahydrate, copper acetate monohydrate, copper formate. In a preferred embodiment, the copper ion source is copper chloride.

At step 66, the method 50 includes calcining the copper intermediate at 400 to 600° C. to form the CuO nanoparticles. For example, the calcining can be performed at 410° C., 420° C., 430° C., 440° C., 450° C., 460° C., 470° C., 480° C., 490° C., 500° C., 510° C., 520° C., 530° C., 540° C., 550° C., 560° C., 570° C., 580° C., 590° C., or 600° C.

At step 68, the method 50 includes including forming the $g$-$C_3N_4$ nanosheets by heating urea to 450 to 650° C. For example the urea may be heated to 450° C., 460° C., 470° C., 480° C., 490° C., 500° C., 510° C., 520° C., 530° C., 540° C., 550° C., 560° C., 570° C., 580° C., 590° C., 600° C., 610° C., 620° C., 630° C., 640° C., or 650° C. In some embodiments, the urea is heated to 550° C. to form the $g$-$C_3N_4$ nanosheets. Urea may be heated in a muffle furnace, tube furnace, electric oven, or fluidized bed furnace at a desired temperature.

At step 70, the method 50 includes ultrasonically treating a mixture of the MgO nanoparticles, CuO nanoparticles, and $g$-$C_3N_4$ nanosheets to form a nanoparticle mixture. As used herein, the term 'ultrasonication' refers to a process that uses high-frequency sound waves to agitate particles in a liquid, creating pressure changes that generate microscopic bubbles. When these bubbles collapse, they produce shear forces that help break apart particles, disperse substances, or enhance chemical reactions. Ultrasonic mixing generates high-energy cavitation, ensuring uniform dispersion of the mixture of the MgO nanoparticles, CuO nanoparticles, and $g$-$C_3N_4$ nanosheets. In some embodiments, other modes of agitation known to those of ordinary skill in the art, for example, via stirring, swirling, or a combination thereof may be employed to form the nanoparticle mixture.

At step 72, the method 50 includes adding the $MnO_2$ nanoparticles to the nanoparticle mixture to form a nanocomposite precursor. In some embodiments, the $MnO_2$ nanoparticles are added as a dry powder directly into the nanoparticle mixture, followed by sonication for uniform distribution. In some embodiments, the $MnO_2$ nanoparticles are dispersed in a solvent (e.g., isopropanol) and sonicated for a set time before being added to the mixture. In some embodiments, the $MnO_2$ nanoparticles are added as a gel-type precursor prepared from glycerol and potassium permanganate ($KMnO_4$), followed by mixing and sonication with the nanoparticle solution. In some embodiments, the $MnO_2$ is introduced after the mixture of the CuO, MgO, and $g$-$C_3N_4$ nanosheets, followed by stirring and sonication to form a homogeneous nanocomposite precursor. In some embodiments, the $MnO_2$ nanoparticles are added in suspension form, mixed into the nanoparticle solution, and sonicated to ensure even distribution. In some embodiments, the $MnO_2$ is added to a heated nanoparticle mixture, followed by stirring and sonication for integration into the nanocomposite.

At step 74, the method 50 includes heating the nanocomposite precursor to 250 to 450° C. to form the catalytic $MnO_2/MgO/CuO/g$-$C_3N_4$ nanocomposite. For example, the heating may be performed at 250° C., 260° C., 270° C., 280° C., 290° C., 300° C., 310° C., 320° C., 330° C., 340° C., 350° C., 360° C., 370° C., 380° C., 390° C., 400° C., 410° C., 420° C., 430° C., 440° C., or 450° C. In some embodiments, the heating can be performed by using heating appliances such as ovens, microwaves, autoclaves, hot plates, heating mantles and tapes, oil baths, salt baths, sand baths, air baths, hot-tube furnaces, and hot-air guns.

The method includes hydrolyzing sodium borohydride ($NaBH_4$) with water in the presence of the above-described nanocomposite catalyst at a temperature of from about 20 to about 75° C., for example from about 25 to about 70° C., from about 30 to about 60° C., from about 35 to about 50° C., or about 40° C. In some embodiments, the ratio by weight of sodium borohydride to the nanocomposite catalyst in the hydrolysis reaction is from about 1:1 to about 3:1, for example from about 1.5:1 to about 2.5:1 or from about 2:1 to about 2:1. In other embodiments the ratio by weight of sodium borohydride to the nanocomposite catalyst in the hydrolysis reaction is from about 1:0.01 to about 1:0.1.

The present method does not preclude one or more further borohydride salts being present in the catalyzed hydrolysis reaction in addition to sodium borohydride. Mention in this regard may be made of lithium borohydride, potassium borohydride, calcium borohydride, magnesium borohydride, aluminum borohydride, zinc borohydride, barium borohydride, cesium borohydride, rubidium borohydride, strontium borohydride, tetrabutylammonium borohydride, ammonium borohydride, trimethylammonium borohydride, benzyltrimethylammonium borohydride, potassium tetraphenylborate, lithium tetrafluoroborate, potassium tetrafluoroborate, sodium tetrafluoroborate, copper borohydride, nickel borohydride, iron borohydride, lead borohydride, copper(II) borohydride, thallium borohydride, gold borohydride, silver borohydride, rhodium borohydride, palladium borohydride and antimony borohydride.

In embodiments, the $NaBH_4$, in solid form, is mixed with the nanocomposite in solid form to provide a solid composition that is stable and storable at room temperature. In some embodiments, there may be no decomposition to form hydrogen when the solid mixture of the $NaBH_4$ and the nanocomposite is stored under anhydrous conditions. The stable composition may be later used as a source of hydrogen via the addition of water thereto. In some embodiments, the $NaBH_4$, in solid form and the nanocomposite are mixed immediately prior to contact with water.

The method has a hydrogen generation rate of 850 to 1150 milliliters per minute per gram (mL $min^{-1}$ $g^{-1}$) of sodium borohydride at 40° C. for example, the hydrogen generation rate may be 850 mL $min^{-1}$ $g^{-1}$, 875 mL $min^{-1}$ $g^{-1}$, 900 mL $min^{-1}$ $g^{-1}$, 925 mL $min^{-1}$ $g^{-1}$, 950 mL $min^{-1}$ $g^{-1}$, 975 mL $min^{-1}$ $g^{-1}$, 1000 mL $min^{-1}$ $g^{-1}$, 1025 mL $min^{-1}$ $g^{-1}$, 1050 mL $min^{-1}$ $g^{-1}$, 1075 mL $min^{-1}$ $g^{-1}$, 1100 mL $min^{-1}$ $g^{-1}$, 1125 mL $min^{-1}$ $g^{-1}$, or 1150 mL $min^{-1}$ $g^{-1}$. The high hydrogen generation rate indicates the efficient performance of the catalytic $MnO_2/MgO/CuO/g$-$C_3N_4$ nanocomposite in facilitating the hydrolysis of sodium borohydride. The $MnO_2/MgO/CuO/g$-$C_3N_4$ nanocomposite excellent catalytic activity at moderate temperatures ensures rapid and substantial hydrogen production, making it a promising solution for on-demand hydrogen generation applications.

EXAMPLES

The following examples demonstrate a method of producing hydrogen gas. The examples are provided solely for illustration and are not to be construed as limitations of the present disclosure, as many variations thereof are possible without departing from the spirit and scope of the present disclosure.

Example 1. Method of Preparation

A sol-gel method was used to manufacture magnesium oxide nanoparticles (NPs). The sol-gel method used reagents such as sodium hydroxide (NaOH) as a precipitating agent and magnesium nitrate hexahydrate ($Mg(NO3)_2 \cdot 6H_2O$) as a precursor. The precursor solution was continuously stirred while 0.5 molar (M) magnesium nitrate and 2 M NaOH were added dropwise into 250 milliliters (ml) of DI water and 200 ml of DI water, respectively. The mixture was heated to between 7° and 80° C. for an hour while being constantly stirred. Later, magnesium hydroxide precipitation turned white. The precipitate was thoroughly cleaned with double-distilled water. The final step involved washing the precipitate with methanol and drying for an hour at 60° C. After that, the powder sample was annealed in air for more than two hours at 400° C. After that, the nanoparticles were gathered.

The redox reaction of glycerol and potassium permanganate ($KMnO_4$) in an aqueous solution resulted in the formation of $MnO_2$. A gel-type precursor was formed when 400 mL of 0.4 M aqueous glycerol solution was added dropwise into 200 mL of 0.3 M $KMnO_4$ aqueous solution under vigorous stirring for 20 min at room temperature (25° C.). The obtained gel was kept for 24 hours. The resulting solid material was carefully washed with DI water and centrifuged several times (at 3000 rotations per minute (rpm) for 10 min) to remove excess K+ ions. The product was then dried in a hot-air electric oven at 80° C. to get a blackish-brown-colored product. Following that in an electric muffle furnace under an air atmosphere for 6 h at two different temperatures of 700° C. [See. Siddique, M. A. B., et al., *Preparation of Manganese Oxide Nanoparticles with Enhanced Capacitive Properties Utilizing Gel Formation Method. ACS omega*, 2022. 7 (51): p. 48007-48017, incorporated herein by reference in its entirety].

Copper chloride ($CuCl_2$) was used in the precipitation process to create CuO nanostructures. To obtain a 0.1 M concentration, the precursor was first dissolved in 100 milliliters of deionized water. 0.1 M NaOH solution was added gradually while vigorously stirring until the pH reached 14. The black precipitates appeared after washing with deionized water, and 100% ethanol repeatedly until the pH reaches 7. After obtaining black precipitates, deionized water and 100% ethanol were used to wash the precipitates multiple times until the pH reached 7. The cleaned precipitates were then dried for 16 hours at 80° C. Lastly, the precursors underwent a 4-hour calcination at 500° C. [See. Phiwdang, K., S. Suphankij, W. Mekprasart, and W. Pecharapa, *Synthesis of CuO nanoparticles by precipitation method using different precursors. Energy procedia*, 2013. 34: p. 740-745, incorporated herein by reference in its entirety].

The production of g-$C_3N_4$ nanomaterial was achieved through the thermal decomposition of urea molecules. A total of 3.5 grams (g) of urea material was subjected to incineration at a temperature of 550° C. for a duration of 120 min. The unprocessed g-$C_3N_4$ nanomaterials, which had a yellow color, were subsequently subjected to cooling, grinding, and packaging processes and placed into dark containers.

For fabrication of nanocomposite, 6 g g-$C_3N_4$ was added in 220 ml isopropanol for sonication process for 30 mins. Then, 2 g CuO NPs and 1 gm MgO NPs were added to the mixture solution under sonication for 15 mins. Then, 1 g $MnO_2$ NPs was added to the same solution under the same conditions for one hour. The prepared $MnO_2$@MgO·CuO@g-$C_3N_4$ were filtered through Whatman filter paper (0.45 m) followed by rinsing with a solution mixture of distilled water and ethanol (1:1). After drying at 100 C for 5 h, the obtained dried powder was calcined at 350° C. for 3 h to produce $MnO_2$@MgO·CuO@g-$C_3N_4$ nanocomposite [See. Alshahrani, A. A., et al., *The preparation of Zr—$TiO_2$@ g-$C_3N_4$ nanocomposites to remove ciprofloxacin from water. Journal of Molecular Structure*, 2024: p. 138891; Mirghiasi, Z., F. Bakhtiari, E. Darezereshki, and E. Esmaeilzadeh, *Preparation and characterization of CaO nanoparticles from Ca (OH) 2 by direct thermal decomposition method. Journal of industrial and Engineering chemistry*, 2014. 20 (1): p. 113-117, incorporated herein by reference in its entirety].

Example 2: Catalytic Results

Figure 2B:
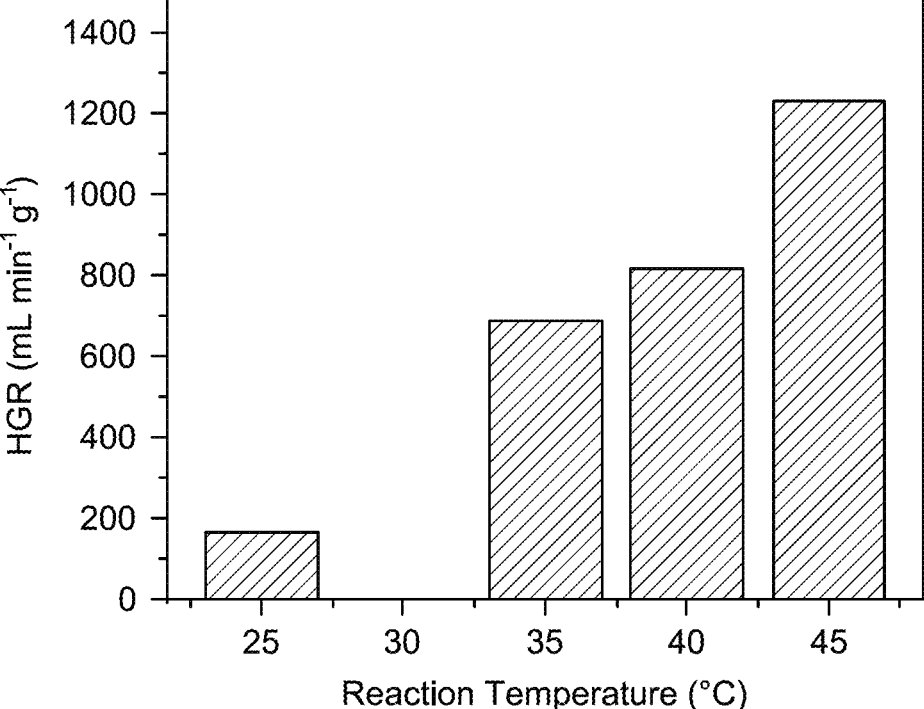
FIG. 2B shows hydrogen generation rates (HGR) with reaction temperature, over the $MnO_2@MgO\cdot CuO@g$-$C_3N_4$ composite, according to certain embodiments.
Figure 2C:
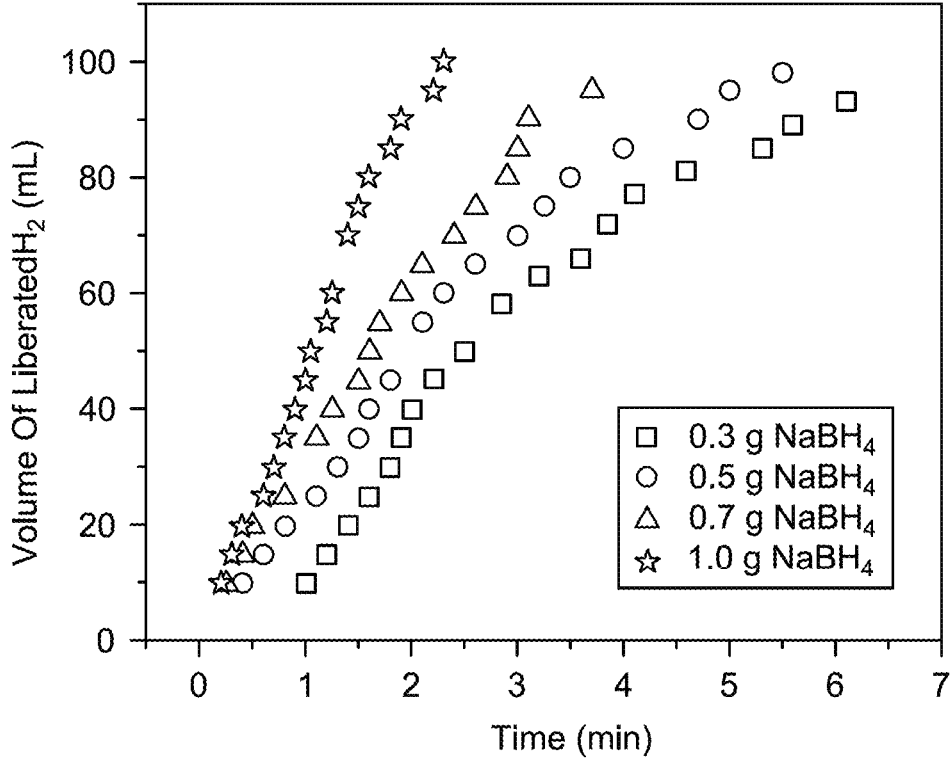
FIG. 2C shows variation of volume of liberated $H_2$ with reaction time with the $MnO_2@MgO\cdot CuO@g$-$C_3N_4$ composite at a reaction temperature of 40° C., according to certain embodiments.
Figure 2D:
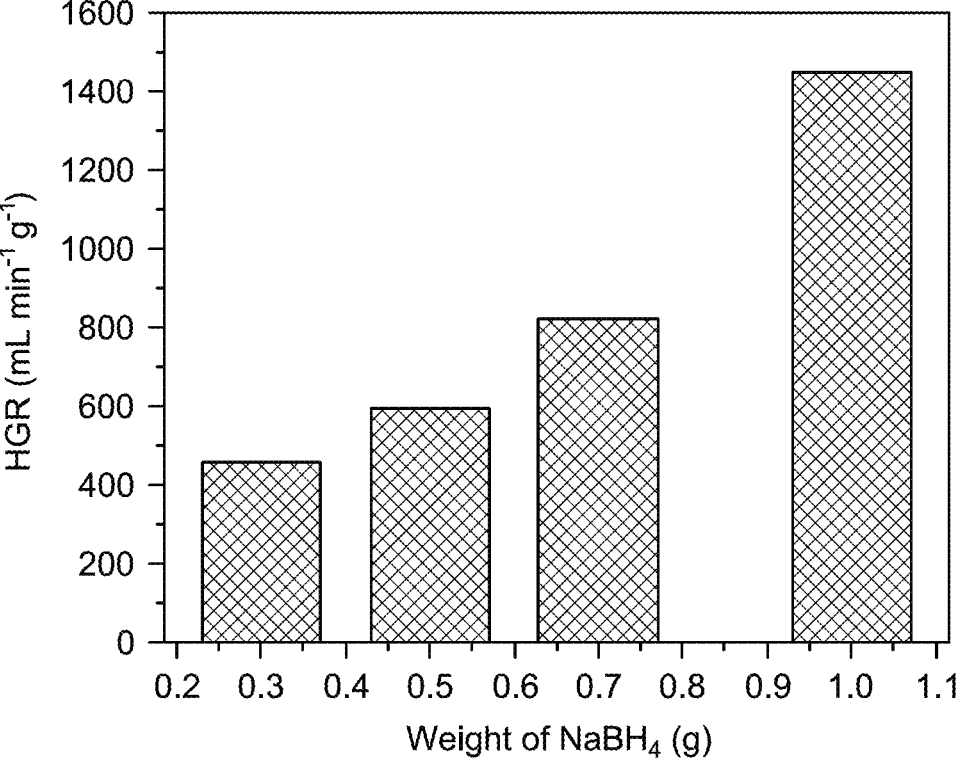
FIG. 2D shows HGR with weight of $NaBH_4$, over the $MnO_2@MgO\cdot CuO@g$-$C_3N_4$ composite at a reaction temperature of 40° C., according to certain embodiments.
Figure 3A:
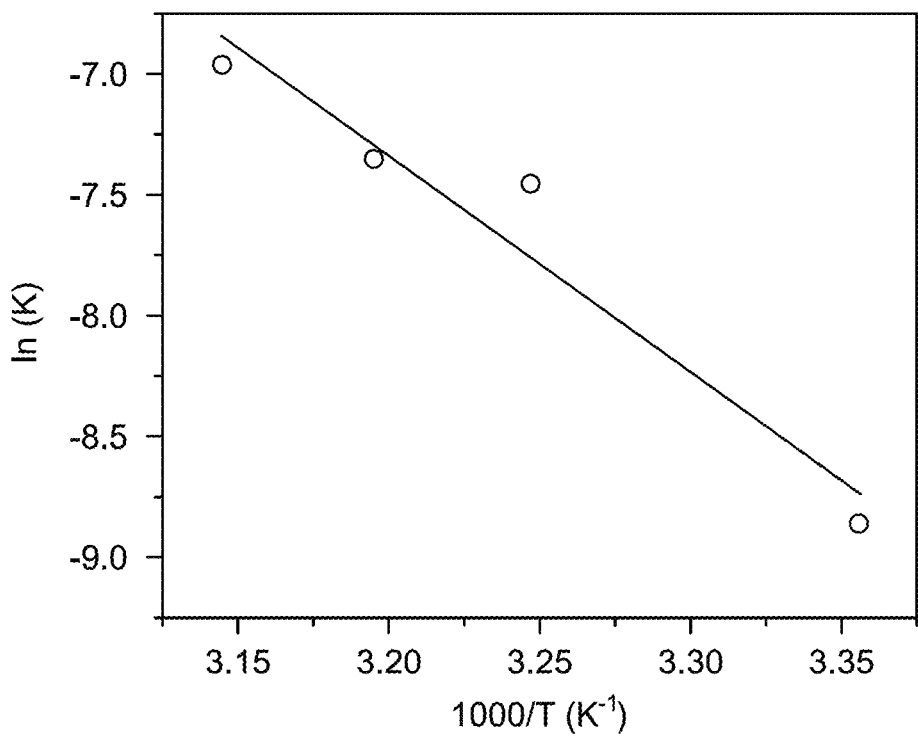
FIG. 3A shows Arrhenius plot for the catalytic hydrolysis of $NaBH_4$, over the $MnO_2@MgO\cdot CuO@g$-$C_3N_4$ composite at reaction temperatures of 25-45° C., according to certain embodiments.
Figure 3B:
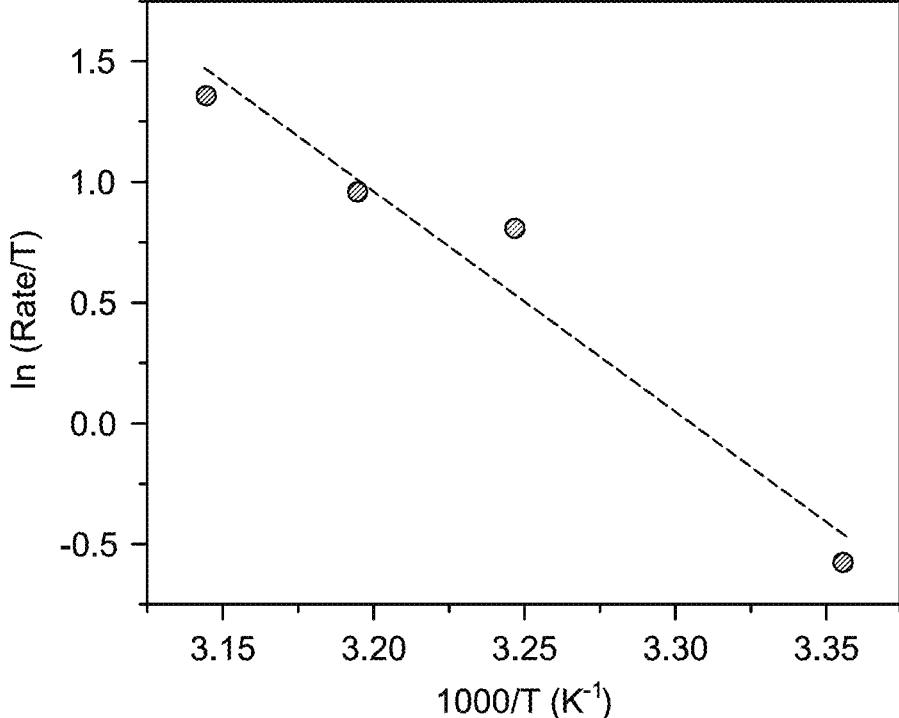
FIG. 3B shows Eyring plot for the catalytic hydrolysis of $NaBH_4$, over the $MnO_2@MgO\cdot CuO@g$-$C_3N_4$ composite at reaction temperatures of 25-45° C., according to certain embodiments.

The results of hydrolysis of $NaBH_4$ with and without $MnO_2$@MgO·CuO@g-$C_3N_4$ catalyst are shown in FIG. 2A & FIG. 2B. The catalytic action of the $MnO_2$@MgO·CuO@g-$C_3N_4$ was clearly observed where the catalytic reaction exhibited catalytic activity higher than the self-hydrolysis process (FIG. 2A). According to the data analysis, hydrogen gas volume increases gradually over the reaction time. In addition, the catalytic hydrolysis reaction increases with increasing the reaction temperature. Results demonstrate that, on using 0.7 g of $NaBH_4$, values of HGR of 168, 690, 820, and 1230 milliliters per minute per gram (mL $min^{-1}$ $g^{-1}$) were obtained at reaction temperatures of 25, 35, 40, and 45° C., respectively (FIG. 2B). Results also indicate that, at a reaction temperature of 40° C., the HGR increases with increasing the weight of $NaBH_4$ (FIG. 2C). It gave values of HGR of 469-, 540-, 820-, and 1450-mL $min^{-1}$ $g^{-1}$ corresponding to weight of $NaBH_4$ of 0.3, 0.5, 0.7, and 1.0 g respectively (FIG. 2D). The reaction was found to proceed according to a first-order kinetics with an activation energy 73.9 kilojoules per mole (kJ $mol^{-1}$) (FIG. 3A). Finally, on applying the Eyring equation (FIG. 3B) to the catalytic reaction, thermodynamic parameters such as ($\Delta H^{\#}$, $\Delta S^{\#}$ and $\Delta G^{\#}$) could be determined. ($\Delta H^{\#}$) and ($\Delta S^{\#}$) were estimated to be 75.3 kJ $mol^{-1}$ and 0.26 kilojoules per mole per kelvin (kJ $mol^{-1}$ $K^{-1}$), respectively. At 25, 30, 40, and 50° C., the $\Delta G^{\#}$ values were −2.18, −4.78, −6.08, and −7.38 kJ $mol^{-1}$, respectively. These findings suggest that borohydride hydrolyzes spontaneously, endothermically, and entropy-driven over $MnO_2$@MgO·CuO@g-$C_3N_4$.

The $MnO_2$@MgO·CuO@g-$C_3N_4$ catalyst, was synthesized using a simple and cost-effective method. The catalytic $MnO_2$/MgO/CuO/g-$C_3N_4$ nanocomposite was applied in hydrogen generation as a fuel, demonstrating exceptional hydrogen generation rates (HGR). Catalytic activity evaluations reveal that the catalyst efficiently hydrolyzes $NaBH_4$, achieving significantly high HGR values across a range of reaction temperatures.

Numerous modifications and variations of the present disclosure are possible in light of the above teachings. It is, therefore, to be understood that within the scope of the appended claims, the invention may be practiced otherwise than as specifically described herein.

The invention claimed is:

1. A method of forming hydrogen gas, the method comprising reacting a borohydride with water in the presence of a $MnO_2$/MgO/CuO/g-$C_3N_4$ nanocomposite as a catalyst to form hydrogen gas, wherein the $MnO_2$/MgO/CuO/g-$C_3N_4$ nanocomposite comprises
5 to 15 wt. % MgO nanoparticles;
5 to 15 wt. % $MnO_2$ nanoparticles;
15 to 25 wt. % CuO nanoparticles; and
55 to 65 wt. % g-$C_3N_4$ nanosheets, and wherein the MgO nanoparticles, $MnO_2$ nanoparticles, and CuO nanoparticles are disposed on the g-$C_3N_4$ nanosheets.

2. The method of claim 1, wherein
the MgO nanoparticles have a mean particle size of 10 to 1000 nm,
the $MnO_2$ nanoparticles have a mean particle size of 10 to 1000 nm, and
the CuO nanoparticles have a mean particle size of 10 to 1000 nm.

3. The method of claim 1, wherein
the g-$C_3N_4$ nanosheets have a mean nanosheet size of 50 to 5000 nm and a mean nanosheet thickness of 0.5 to 50 nm.

4. The method of claim 1, further comprising:
forming the catalytic $MnO_2$/MgO/CuO/g-$C_3N_4$ nanocomposite by:
ultrasonically treating a mixture of MgO nanoparticles; CuO nanoparticles; and g-$C_3N_4$ nanosheets to form a nanoparticle mixture;
adding the $MnO_2$ nanoparticles to the nanoparticle mixture to form a nanocomposite precursor; and
heating the nanocomposite precursor to 250 to 450° C. to form the catalytic $MnO_2$/MgO/CuO/g-$C_3N_4$ nanocomposite.

5. The method of claim 4, further comprising
heating a first solution comprising a magnesium ion source and a first hydroxide base to 50 to 100° C. to form a magnesium hydroxide intermediate; and
calcining the magnesium hydroxide intermediate at 300 to 500° C. to form the MgO nanoparticles.

6. The method of claim 5, wherein
the first hydroxide base is NaOH.

7. The method of claim 5, wherein
the magnesium ion source is magnesium nitrate.

8. The method of claim 5, wherein
the first solution has a molar ratio of magnesium ion source to first hydroxide base of 1:8 to 1:1.

9. The method of claim 4, further comprising
gelling glycerol and potassium permanganate to form a gel;
aging the gel for 12 to 48 hours to form an aged gel;
washing the aged gel to form a manganese precursor; and
calcining the manganese precursor at 600 to 800° C. to form the $MnO_2$ nanoparticles.

10. The method of claim 9, wherein
the gel has a molar ratio of potassium permanganate to glycerol of 1:10 to 1:2.

11. The method of claim 4, further comprising forming the CuO nanoparticles by mixing a copper ion source and a second hydroxide base to form a copper intermediate; and calcining the copper intermediate at 400 to 600° C. to form the CuO nanoparticles.

12. The method of claim 11, wherein the second hydroxide base is NaOH.

13. The method of claim 11, wherein the copper ion source is copper chloride.

14. The method of claim 4, further comprising forming the g-$C_3N_4$ nanosheets by heating urea to 450 to 650° C. to form the g-$C_3N_4$ nanosheets.

15. The method of claim 1, wherein the borohydride is sodium borohydride.

16. The method of claim 1, wherein the method has a hydrogen generation rate of 850 to 1150 mL per minute per gram of sodium borohydride at 40° C.

\* \* \* \* \*